United States Patent [19]

Rigamonti

[11] Patent Number: 5,698,270

[45] Date of Patent: Dec. 16, 1997

[54] PROCESS FOR THE PREPARATION OF ANTISCRATCH AND ANTIABRASION SHAPED ARTICLES BASED ON ACRYLIC POLYMERS

[75] Inventor: Marco Rigamonti, Milan, Italy

[73] Assignee: Atohaas Holding C.V., Haarlem

[21] Appl. No.: 812,768

[22] Filed: Mar. 6, 1997

Related U.S. Application Data

[63] Continuation of Ser. No. 443,758, May 18, 1995, abandoned.

[30] Foreign Application Priority Data

May 19, 1994 [IT] Italy ................... MI94A1014

[51] Int. Cl.⁶ ................... C08F 2/46; C08F 7/04
[52] U.S. Cl. ................ 427/493; 427/508; 427/512
[58] Field of Search ................... 427/512, 508, 427/517, 493

[56] References Cited

U.S. PATENT DOCUMENTS

| | | | |
|---|---|---|---|
| 4,065,587 | 12/1977 | Ting | 427/512 |
| 4,273,799 | 6/1981 | Kamada et al. | 427/512 |
| 4,287,227 | 9/1981 | Kamada et al. | 427/512 |
| 4,291,097 | 9/1981 | Kamada et al. | 427/512 |
| 4,323,592 | 4/1982 | Sasaki et al. | |
| 4,338,345 | 7/1982 | Kishida et al. | 427/512 |
| 4,373,007 | 2/1983 | Russell | |
| 4,446,175 | 5/1984 | Brixius et al. | |
| 4,617,194 | 10/1986 | Scott et al. | |
| 4,902,578 | 2/1990 | Kerr, III | 427/517 |
| 5,051,308 | 9/1991 | Reed et al. | |
| 5,569,498 | 10/1996 | Rigamonti et al. | 427/493 |
| 5,578,378 | 11/1996 | Kruger et al. | 427/517 |

FOREIGN PATENT DOCUMENTS

| | | |
|---|---|---|
| 0 181 528 | 5/1986 | European Pat. Off. |
| 0 337 695 | 10/1989 | European Pat. Off. |
| 0 399 441 | 11/1990 | European Pat. Off. |
| 0 424 006 | 4/1991 | European Pat. Off. |
| 0 571 808 | 12/1993 | European Pat. Off. |
| 0 652 249 | 5/1995 | European Pat. Off. |

OTHER PUBLICATIONS

Derwent Publication Ltd., London, GB; An 91–025254 pub. May 12, 1990.
Patent Abstract of JP–A–2 294 339 published May 12, 1990.
*Hackh's Chemical Dictionary*, 3rd ed. and 4th ed, J. Grant, ed., 1944 and 1969, (no month), excerpts McGraw–Hill Book Co., Inc., N.Y.
*The Condensed Chemical Dictionary*, 10th ed, G. Hawley, ed., Van Nostrand Reinhold Co., 1981, no month, excerpts.
English Abstract of German Application No. DE 2,928,512 to Abraham et al (date 1=Jul. 7, 1979).

*Primary Examiner*—Marianne Padgett
*Attorney, Agent, or Firm*—Burns, Doane, Swecker & Mathis, L.L.P.

[57] ABSTRACT

The invention relates to a process to confer antiscratch and antiabrasion properties onto a shaped article based on thermoplastic acrylic polymers by coating the article with a composition comprising a) 40–98.5% by weight of a methacrylic or acrylic monomer and/or an oligomer of the methacrylic or acrylic monomer, the monomer or oligomer having at least two polymerizable double bonds;

b) 1–20% by weight of a polar methacrylic or acrylic monomer and/or oligomers of the polar monomer;

c) 0.5–10% by weight of a UV photoinitiator;

and optionally containing silica, UV stabilizers and non ionic surfactants; by polymerizing and crosslinking in situ said composition by UV light, at temperatures of 20°–65° C.

11 Claims, No Drawings

PROCESS FOR THE PREPARATION OF ANTISCRATCH AND ANTIABRASION SHAPED ARTICLES BASED ON ACRYLIC POLYMERS

This application is a continuation of application Ser. No. 08/443,758, filed May 18, 1995 now abandon.

BACKGROUND OF THE INVENTION

1. Field of the Invention

The present invention relates to a process to render antiscratch and abrasion-resistant the surface of shaped articles, plates and films based on thermoplastic acrylic polymers by coating with a mixture of particular polymerizable acrylic monomers and UV photoinitiators and subsequent polymerization and crosslinking by UV radiation of the coating.

The invention relates, moreover, to antiscratch and abrasion-resistant shaped articles obtained by the aforesaid process.

2. Description of the Related Art

It is known that one of the problems met in the use of plates and films, in particular the transparent ones, based on thermoplastic acrylic polymers, such as, for instance polymethylmethacrylate (PMMA), is due to their easy scratching and abrasion with consequent decrease of their transparence and decay of the surface aspect.

The art has suggested various surface treatments of plates and shaped articles of thermoplastic polymers, including acrylic polymers, in order to avoid the aforesaid inconvenience.

Such treatments generally comprise the application on the article or on the thermoplastic plate (substrate) of a layer of polymerizable unsaturated monomers, which was polymerized and crosslinked in situ by heating at high temperatures, from 80° C. to the Tg of the substrate, in the presence of radical polymerization initiators.

A polymerized and crosslinked coating of sufficient hardness improving the abrasion resistance of the thermoplastic article was obtained in this way.

However such treatments were not free from inconveniences, as they had to be carried out in an oxygen-free place, in particular in an inert atmosphere (nitrogen) in order to avoid inhibition due to oxygen on the polymerization and crosslinking carried out at high temperatures and degradation of the polymeric substrate with formation, besides, of undesired yellowish coloring. Moreover, the so obtained coatings did not always show a good adhesion to substrate and a good transparence.

It was therefore difficult and complex to carry out said treatments in absence of oxygen, in particular in industrial plants for the continuous manufacture of plates and films of thermoplastic polymers.

There were moreover suggested treatments wherein the monomeric layer applied on the polymeric substrate was polymerized and crosslinked by using UV rays in the presence of photoinitiators, which could be carried out in room conditions, i.e. in the presence of air and at quite low temperatures, not higher than 40° C., such as not to effect the dimensional stability of the polymeric substrate, as well its mechanical, aspect and transparence properties, or, anyway, to avoid degradation thereof.

However the polymerized and crosslinked coatings so obtained showed an insufficient or poor adhesion to the polymeric substrate.

In order to obviate the insufficient adhesion to the substrate of the polymerized and crosslinked coating it was suggested in patent DE 2,928,512 to carry out polymerization and crosslinking by UV irradiation of the monomeric layer at high temperatures from 70° C. to 150° C., at any rate near the Tg of the polymer forming the substrate, using monomers with at least two double bonds, having a boiling temperature higher than that at which polymerization and crosslinking are carried out.

In the case of thermoplastic substrates based on polymethylacrylate (PMMA), the advantageous temperatures to obtain a good adhesion were from 90° C. to 110° C.

The method suggested in the aforesaid German patent, wherein it results necessary to operate at high temperatures, near the Tg of the acrylic polymer, for obtaining good adhesions, leads however to a worsening of the mechanical properties of the acrylic substrate, to the formation of surface defects, to its brittleness and to the degradation of its surface by formation of undesired yellowish or orange coloring and to a reduction of its..transparence.

SUMMARY OF THE INVENTION

A simple has now been found process to render antiscratch and abrasion-resistant shaped articles based on thermoplastic acrylic polymers, in particular PMMA, which does not show the drawbacks shown by the known processes, consisting in coating the surface of the articles with a mixture which comprises acrylic monomers having at least two polymerizable double bonds and acrylic monomers having polar groups and an UV photoinitiator, and in polymerizing and crosslinking by UV light said mixture at low temperatures from 20° C. to 65° C.

The articles obtained by said process show a good surface hardness, high antiscratch and abrasion resistance properties, with an optimal adhesion to the substrate of the polymerized and crosslinked monomeric coating. Moreover they maintain their transparence and their mechanical and surface aspect properties without showing undesired yellowish coloring.

An object of the present invention is therefore a process for preparing shaped articles, plates and films based on acrylic thermoplastic polymers, having antiscratch properties and abrasion-resistant, consisting in by applying on the surface of a shaped article based on thermoplastic acrylic polymers a homogeneous layer of a monomeric composition comprising:

a) from 40 to 98.5% by weight of a methacrylic or acrylic monomer an oligomer of the methacrylic or acrylic monomer, the monomer or oligomer having at least two polymerizable double bonds and a boiling temperature higher than the Tg of the acrylic polymers forming the article;

b) from 1 to 20% by weight of at least a polar methacrylic or acrylic monomer having the following formula

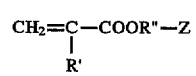

wherein:

R' is H, $CH_3$; R" is alkylene $C_2$-$C_6$; Z is —OH, —COOH, —$SO_3H$, —$NH_2$; —$CONH_2$ and/or oligomers of the polar monomers formed by 2 to 7 monomeric units;

c) from 0.5 to 10% by weight of a UV light polymerization initiator;

d) from 0 to 3% by weight of colloidal silica and/or colloidal metal oxides;

e) from 0 to 8% by weight of UV stabilizers;

f) from 0 to 3% by weight of non ionic surfactants;

the sum of the amounts a+b+c+d+e+f being 100, and in submitting the article so coated to UV radiation at temperatures from 20° to 65° C.

DESCRIPTION OF THE PREFERRED EMBODIMENTS

As thermoplastic polymers forming the shaped article one can cite for instance polymers or copolymers generally transparent, of esters of the acrylic or methacrylic acid, in particular PMMA, transparent alloys of said polymers or copolymers with polyvinylchloride (PVC) or polyvinylidenefluoride (PVDF), polymethylmethacrylate containing in dispersed phase acrylic elastomers (shock resistant PMMA).

Polyfunctional methacrylates or acrylates, for instance of glycols, polyols, ethoxylated polyols, aliphatic urethanes, melamine and their blends can be utilized as components (a).

Examples of such compounds are tripropylene glycoldiacrylate (TPDGA), 1,6-hexandiol triacrylate (HDDA), trimethylolpropane triacrylate (TMPTA), pentaerythrite triacrylate (PETIA), triacrylates of ethoxylated trimethylolpropane, polymethacrylate or polyacrylate urethanes obtained by reacting polyols with isocyanates and hydroxyethylmethacrylates or hydroxyethylacrylates, unsaturated diacrylmelamine.

The aliphatic hexacrylate urethane and the unsaturated diacrylmelamine and their mixtures with TPGDA, HDDA, TMPTA, PETIA have proved to be particularly suitable. Hydroxyalkylmethacrylates, hydroxyalkylacrylates, carobxyalkylmethacrylates, can be used for instance carboxyalkylacrylates, sulfoalkylmethacrylates, sulfoalkylacrylates, aminoalkylmethacrylates, aminoalkylacrylates, aminocarbonylalkylmethacrylates, and aminocarbonylalkylacrylates can be used for instance as components (b).

Hydroxyalkylmethacrylates and hydroxyalkylacrylates, in particular the hydroxyethylmethacrylate (HEMA) and carboxyalkylmethacrylates and carboxyalkylacrylates in particular carboxyethylacrylate (βCEA) have proved to be particularly suitable.

As components (c) can be used radical polymerization initiators at UV light known in the art, such as for instance 2-hydroxy-2-methyl-1-phenyl-propan-1-one- (DAROCURE-1173® of Ciba-Geigy), 1-hydroxy-cyclohexyl-phenyl-ketone (IRGACU-RE-184® of Ciba-Geigy) and those based on benzophenone such as for instance ESACURE KIP 100 E® of Fratelli Lamberti, or their mixtures.

Component (d) is generally used in small amounts, preferably of 0.1–1% by weight, as viscosity regulator of the coating monomeric mixture; to this purpose colloidal silica having a diameter of the primary particles lower than 20 nanometers and a pH of 3–4, are particularly suitable.

As component (e), the UV stabilizers known in the art can be used in order to protect the polymeric article during crosslinking of the coating via UV.

They are generally consisting of benzotriazols and by sterically hindered amines, such as for instance TINUVIN 1130® and TINUVIN 2292® of Ciba-Geigy.

Component (f) is generally used in small amounts as fluidifying agent, especially if the mixture a+b+c has little fluidity, in order to eliminate the spreading defects of such mixture and to improve the coating aesthetic aspect.

Fluoroaliphatic polymeric esters, such as FC-430® of 3-M are particularly suitable to this purpose.

The coating monomeric composition, its viscosity being adjustable at will by varying the monomers percentage, use of colloidal silica and/or of fluidifying non ionic surfactants, can be applied on the substrate with any one of the methods known in the art, for instance by spraying or spreading, so as to form a homogeneous coating layer capable of forming, after polymerization and UV crosslinking, a film having a 0.5–40 μm thickness, preferably from 5 μm to 15 μm.

Films having high thicknesses generally are more rigid and less flexible.

The temperatures at which polymerization and crosslinking of the coating monomeric layer a+b+c are carried out can vary from 20° to 65° C., preferably from 20° to 60° C., more preferably from 30° to 55° C.

It is generally not necessary to operate in absence of oxygen, however if relatively long times of UV radiation are to be used, it is advisable to operate under nitrogen flow to avoid a certain inhibition due to oxygen.

The process according to the present invention can be carried out continuously, integrated with the preparation, for instance by filming and extrusion, of the support shaped article.

More particularly the present process can be continuously carried out, on a line of extrusion of acrylic plates in areas wherein the temperature of the plate is lower than 65° C.

In order to avoid overheating of the plate, due to the infrared component of the UV radiation emitted from UV lamps commonly used for polymerizing and crosslinking the coating, one can utilize UV lamps having a reduced infrared emission or placing between the UV lamp and the plate a filter eliminating most of infrared radiations, such as for instance a PYREX® of a 2–3 mm thickness and/or utilize a flow of cold gas (air and/or nitrogen) to maintain the system within the temperature limits indicated above.

A further object of the present invention are shaped articles, plates and films based on thermoplastic acrylic polymers having an antiscratch and abrasion-resistant coating, obained by the process of the present invention.

The shaped articles coated according to the process of the present invention show high antiscratch and abrasion resistance properties, an optimal adhesion of the coating film to the acrylic substrate, maintain unchanged their original transparence, their dimensional stability, their mechanical characteristics and do not show undesired yellowish coloring.

In order to verify the effectiveness of both antiscratch and antiabrasion treatment, two distinct methods have been used, since the two properties are distinguishable.

To measure the scratch resistance, the hardness test has been used with wood pencils according to ASTM D 3363.

To measure the abrasion resistance it has been adopted the method by falling of powder of silicon carbon on the treated plate and the consequent loss of transparence has been measured according to ASTM D 673.

The adhesion of the film to the support was determined by applying on the film an adhesive tape type 610 (3M) according to ASTM 3359 standard.

Optical tests have been carried out to verify the effectiveness of the antiabrasion paints.

The transmittance and turbidity to light tests have been carried out according to ASTM D 1003.

The yellow index has been determined according to ASTM D 1925.

Some examples are given for illustrative purposes.

EXAMPLE 1

A PMMA plate of a 3 mm thickness was coated by spreading with a layer of 10 μm of a mixture containing 50% by weight of aliphatic hexacrylate urethane (EB 1290, UCB), 40% of 1,6 hexandiol diacrylate (HDDA), 8% of hydroxyethylmethacrylate (HEMA) and 2% of UV photoinitiator (DAROCURE 1173®, Ciba-Geigy).

The formulation was polymerized with two 80 W/cm UV lamps with dichroic quartz, at a feeding rate of 1 m/min.

The substrate temperature did not exceed 60° C. The crosslinked film showed an optimal adhesion on the PMMA plate a pencil resistance of 6 H hardness (hardness from B to H for untreated PMMA), a haze after the falling of two thousand grams of silicon carbide of about 6% (untreated PPMA plate about 11.5%) and an unchanged yellow index (plate+film).

EXAMPLE 2

A HIPMMA plate (shock resistant polymethylmethacrylate; matrix=PMMA, dispersed phase=acrylic elastomers and PMMA) of a 3 mm thickness was coated by spreading with a 10 μm layer of a mixture similar to that of example 1, but with the following differences: use of 6% by weight of hydroxyethylmethacrylate (HEMA) and of 4% of UV photoinitiator (DAROCURE 1173®). 1% by weight of TINUVIN 2292® and 1% of TINUVIN 1130® (stabilizers at UV, Ciba-Geigy) were added to 100% of the mixture. The crosslinking conditions are the same as in example 1. The crosslinked film showed an optimal adhesion on the HIPMMA plate, a pencil resistance of 5 H hardness (untreated HIPMMA hardness=2B), a haze after the falling of two thousand grams of silicon carbide of about 7% (untreated HIPPMA plate=18.5%) and an unchanged yellow index. The film shows moreover a good elasticity.

EXAMPLE 3

A PMMA plate of a 3 mm thickness was coated by spreading with a layer of 5 μm of a mixture containing 45% of Santolink AM 1290 of Monsanto (62–68% by weight of unsaturated diacrylmelamine as oligomeric phase and 32–28% tripropylenglycoldiacrylate as monomeric phase), 45% of trimethylolpropane triacrylate (TMPTA), 8% of βCEA (carboxy ethyl acrylate, UCB) and 2% of UV photoinitiator (IRGACURE 184®, Ciba-Geigy).

HPK Philips lamps were applied (about 25 W/cm), keeping the plate at 10 cm from the lamps and in nitrogen flow at room temperature for a period of 5 minutes. The treated plate shows good adhesion, a pencil resistance of 7 H hardness (untreated PMMA hardness: from B to H), and a haze after the falling of 2000 grams of silicon carbide of 8% (11.5% plate in untreated PPMA). The yellow index remained unchanged.

EXAMPLE 4

A PMMA plate having a 3 mm thickness was coated by spreading with a 5 μm layer of a mixture similar to that of example 3.

The crosslinking conditions of example 1 were used (high power lamps, short crosslinking time, crosslinking in air).

The crosslinked film showed the same properties of example 3.

EXAMPLE 5

A PMMA plate of a 3 mm thickness was coated by spreading with a layer of 5 μm of a mixture containing 50% of TMPTA, 40% of ethoxylated trimethylol propane triacrylate (SR 454, Cray Valley), 5% of pentaerythrite triacrylate (PETIA), 2% of βCEA and 3% of UV photoinitiator (Esacure KIP 100, Fratelli Lamberti). 1% of colloidal silica HDK T30 (Wacker) was added to 100% by weight of the mixture. The crosslinking conditions are the same as in example 1. The crosslinked film showed optimal adhesion on the PMMA plate, a pencil resistance of 5–6 H hardness and a haze after the falling of 2000 grams of silicon carbide of about 5.5 (untreated PMMA plate 11.5%). The plate yellow index has remained unchanged.

EXAMPLE 1 (COMPARATIVE)

A PMMA plate of a 3 mm thickness was coated by spreading with a 10 μm layer of the monomeric mixture used in example 1 of DOS 2,928,512, containing 75% by weight of trimethylolpropane triacrylate (TMPTA), 20% by weight of pentaerythrite tetracrylate (PETIA) and 5% by weight of benzoinisobutylether as UV photoinitiator.

Such formulation was polymerized by adopting a 120 W/cm with mean pressure of mercury vapours at the feeding rate of 1 m/min.

The substrate reached a temperature of 95° C.

In these conditions the plate showed a 100% adhesion, an optimal scratch resistance (pencil test=7H), a fairly good abrasion resistance with an haze after 2000 g SiC=7.5 (11.5=untreated PMMA), but a remarkable yellowing.

A certain deformation of the plate and a decay of its mechanical properties, such as for instance the shock and bending resistance were furthermore noticed.

EXAMPLE 2 (COMPARATIVE)

A PMMA plate of a 3 mm thickness was coated by spreading with a 5 μm layer of a mixture having the formulation of example 3.

Such formulation was polymerized in air with normal 120 W/cm lamps having a mean pressure of mercury vapors, kept at a distance of 15 cm from the substrate.

On the film and on the PMMA substrate a temperature near 90° C. was reached (polymerization time lower than 5 seconds). The resulting film was opaque and adhesion-free.

I claim:

1. Process for preparing a shaped article based on acrylic thermoplastic polymers, having antiscratch properties and abrasion-resistant, by applying on a surface of said shaped article based on the thermoplastic acrylic polymers a homogeneous layer of an unpolymerized composition consisting essentially of:

a) from 40 to 98.5% by weight of a methacrylic or acrylic monomer and/or an oligomer of said methacrylic or acrylic monomer, said monomer or oligomer having at least two polymerizable double bonds and a boiling temperature higher than the Tg of said acrylic polymers forming said shaped article;

b) from 1 to 20% by weight of a polar methacrylic or acrylic monomer having the following formula

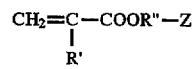

wherein:

R' is H, CH$_3$; R'' is alkylene C$_2$-C$_6$; Z is —OH, —COOH, —SO$_3$H, —NH$_2$, —CONH$_2$; and/or oligomers of said polar monomer consisting of 2 to 7 monomeric units;

c) from 0.5 to 10% by weight of a UV light polymerization initiator;
d) from 0 to 3% by weight of colloidal silica and/or colloidal metal oxides;
e) from 0 to 8% by weight of UV stabilizers;
f) from 0 to 3% by weight of non-ionic surfactants;
a+b+c+d+e+f being 100, and wherein said shaped article with said layer of said unpolymerized composition is exposed to IN radiation at a temperature from 20° C. to 65° C. so as to polymerize and crosslink said unpolymerized composition.

2. Process according to claim 1, wherein the thermoplastic acrylic polymers are polymers or copolymers of esters of methacrylic or acrylic acid, or mixtures of said polymers or copolymers with polyvinylchloride, polyvinylidenefluoride or acrylic elastomers.

3. Process according to claim 1 wherein the thermoplastic acrylic polymer is polymethylmethacrylate.

4. Process according to claim 1 wherein a) is a polyfunctional acrylate or methacrylate of glycols, polyols, ethoxylated polyols, aliphatic urethanes or melamine.

5. Process according to claim 4, wherein a) is selected from the group consisting of tripropyleneglycoldiacrylate, trimethylolpropane triacrylate, 1,6-hexanediol diacrylate, pentaerythrite triacrylate, triacrylate of ethoxylated trimethylolpropane, aliphatic hexacrylate urethane, unsaturated diacrylmelamine and mixtures thereof.

6. Process according to claim 1, wherein b) is selected from the group consisting of hydroxyalkylacrylates, hydroxyalkylmethacrylates, carboxyalkylacrylates, carboxyalkylmethacrylates, sulfoalkylacrylates, sulfoalkylmethacrylates, aminoalkylacrylates, aminoalkylmethacrylates, aminocarbonylalkylacrylates and aminocarbonylalkylmethacrylates.

7. Process according to claim 6, wherein b) is hydroxyethylmethacrylate or carboxyethylacrylate.

8. Process according to claim 1, wherein said temperature is from 30° to 55° C.

9. Process for preparing a plate or film based on acrylic thermoplastic polymers, having antiscratch properties and abrasion-resistant, by applying on a surface of said plate or film based on the thermoplastic acrylic polymers a homogeneous layer of an unpolymerized composition consisting essentially a) from 40 to 98.5% by weight of a methacrylic or acrylic monomer and/or an oligomer of said methacrylic or acrylic monomer, said monomer or oligomer having at least two polymerizable double bonds and a boiling temperature higher than the Tg of said acrylic polymers forming said plate or film;
b) from 1 to 20% by weight of a polar methacrylic or acrylic monomer having the following formula

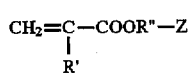

wherein:
R' is H, CH$_3$; R" is alkylene C$_2$—C$_6$; Z is —OH, —COOH, —SO$_3$H, —NH$_2$, —CONH$_2$; and/or oligomers of said polar monomer consisting of 2 to 7 monomeric units;
c) from 0.5 to 10% by weight of a UV light polymerization initiator;
d) from 0 to 3% by weight of colloidal silica and/or colloidal metal oxides;
e) from 0 to 8% by weight of UV stabilizers;
f) from 0 to 3% by weight of non-ionic surfactants;
a+b+c+d+e+f being 100, and wherein said plate or fill with said layer of said unpolymerized composition is exposed to UV radiation at a temperature from 20° C. to 65° C. so as to polymerize and crosslink said unpolymerized composition.

10. Process for preparing a shaped article based on acrylic thermoplastic polymers, having antiscratch properties and abrasion-resistant, by applying on a surface of said shaped article based on the thermoplastic acrylic polymers a homogeneous layer of an unpolymerized composition consisting of:

a) from 40 to 98.5% by weight of a methacrylic or acrylic monomer and/or an oligomer of said methacrylic or acrylic monomer, said monomer or oligomer having at least two polymerizable double bonds and a boiling temperature higher than the Tg of said acrylic polymers forming said shaped article;
b) from 1 to 20% by weight of a polar methacrylic or acrylic monomer having the following formula

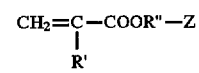

wherein:
R' is H, CH$_3$; R" is alkylene C$_2$-C$_6$; Z is —OH, —COOH, —SO$_3$H, —NH$_2$, —CONH$_2$; and/or oligomers of said polar monomer consisting of 2 to 7 monomeric units;
c) from 0.5 to 10% by weight of a UV light polymerization initiator;
d) from 0 to 3% by weight of colloidal silica and/or colloidal metal oxides;
e) from 0 to 8% by weight of UV stabilizers;
f) from 0 to 3% by weight of non-ionic surfactants;
a+b+c+d+e+f being 100, and wherein said shaped article with said layer of said unpolymerized composition is exposed to UV radiation at a temperature from 20° C. to 65° C. so as to polymerize and crosslink said unpolymerized composition.

11. Process for preparing a plate or film based on acrylic thermoplastic polymers, having antiscratch properties and abrasion-resistant, by applying on a surface of said plate or film based on the thermoplastic acrylic polymers a homogeneous layer of an unpolymerized composition consisting of:

a) from 40 to 98.5% by weight of a methacrylic or acrylic monomer and/or an oligomer of said methacrylic or acrylic monomer, said monomer or oligomer having at least two polymerizable double bonds and a boiling temperature higher than the Tg of said acrylic polymers forming said plate or film;
b) from 1 to 20% by weight of a polar methacrylic or acrylic monomer having the following formula

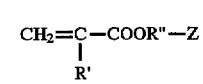

wherein:
R' is H, CH$_3$; R" is alkylene C$_2$—C$_6$; Z is —OH, —COOH, —SO$_3$H, —NH$_2$, —CONH$_2$; and/or oligomers of said polar monomer consisting of 2 to 7 monomeric units;

c) from 0.5 to 10% by weight of a UV light polymerization initiator;
d) from 0 to 3% by weight of colloidal silica and/or colloidal metal oxides;
e) from 0 to 8% by weight of UV stabilizers;
f) from 0 to 3% by weight of non-ionic surfactants;

a+b+c+d+e+f being 100, and wherein said plate or film with said layer of said unpolymerized composition is exposed to UV radiation at a temperature from 20° C. to 65° C. so as to polymerize and crosslink said unpolymerized composition.

* * * * *